United States Patent [19]

Gavin

[11] Patent Number: 5,286,040
[45] Date of Patent: Feb. 15, 1994

[54] ASYMMETRICAL PIPE SEAL AND CLOSURE MEMBER

[76] Inventor: Norman W. Gavin, 2545 Ridge Rd., North Haven, Conn. 06473

[21] Appl. No.: 46,501

[22] Filed: Apr. 12, 1993

Related U.S. Application Data

[63] Continuation of Ser. No. 810,604, Dec. 19, 1991, abandoned.

[51] Int. Cl.⁵ ............................................. F16J 15/10
[52] U.S. Cl. .................................. 277/207 A; 277/152; 277/DIG. 10; 285/4; 220/277
[58] Field of Search ............... 277/207 A, DIG. 10, 277/152, 198, 212 C, 212 FB; 174/65 R, 151; 220/271, 285; 52/98, 99, 100; 285/4

[56] References Cited

U.S. PATENT DOCUMENTS

| | | | |
|---|---|---|---|
| 1,258,884 | 3/1918 | Fife . | |
| 1,278,120 | 9/1918 | Donnelly | 285/4 |
| 1,592,454 | 7/1926 | Frederickson | 285/4 |
| 3,521,414 | 7/1970 | Malissa | 52/98 X |
| 3,602,530 | 8/1971 | Elwart | 285/4 |
| 3,654,965 | 4/1972 | Gramain | 138/89 |
| 3,731,952 | 5/1973 | Elwart | 285/44 X |
| 3,857,589 | 12/1974 | Oostenbrink | 285/110 |
| 4,022,496 | 5/1977 | Crissy et al. | 285/3 |
| 4,440,406 | 4/1984 | Ericson | 277/207 |
| 4,563,847 | 1/1986 | Hasty | 52/98 X |
| 4,625,998 | 12/1986 | Draudt et al. | 285/7 |
| 4,663,036 | 5/1987 | Strobl, Jr. et al. | 210/170 |
| 4,732,397 | 3/1988 | Gavin | 277/207 A |
| 4,805,920 | 2/1989 | Gavin | 277/207 A |
| 4,846,506 | 7/1989 | Bocson et al. | 285/4 |
| 5,000,491 | 3/1991 | Bartholomew | 285/319 |
| 5,036,636 | 8/1991 | Hasty | 52/100 |
| 5,043,536 | 8/1991 | De Bartolo, Jr. | 174/65 R |

FOREIGN PATENT DOCUMENTS 275421 11/1927 Canada ............................ 285/44

OTHER PUBLICATIONS

Christy Concrete Products, Inc., Emeryville, Calif., 1967, p. 311.

Primary Examiner—William A. Cuchlinski, Jr.
Assistant Examiner—Daniel G. DePumpo
Attorney, Agent, or Firm—Robert A. Seemann

[57] ABSTRACT

A seal and closure member of elastomeric material adapted to be cast in situ and including a cylindrical body portion and an integral frusto-conical skirt therewithin. The skirt includes two weakened narrow annular portions of different size, on different centers, across the smaller diameter end portion of the skirt, and another weakened narrow annular portion on the skirt, axially displaced from the smaller diameter end portion.

6 Claims, 7 Drawing Sheets

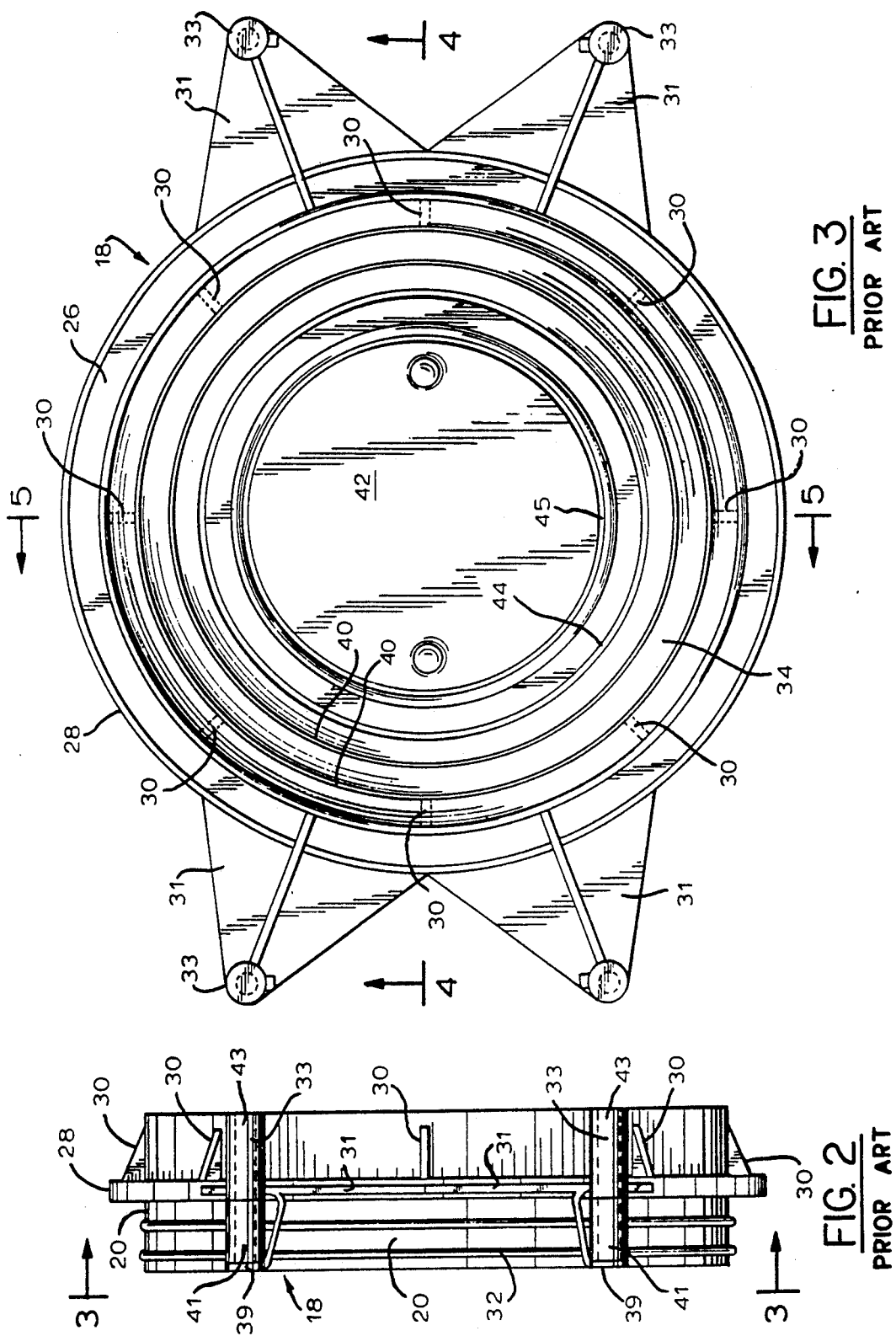

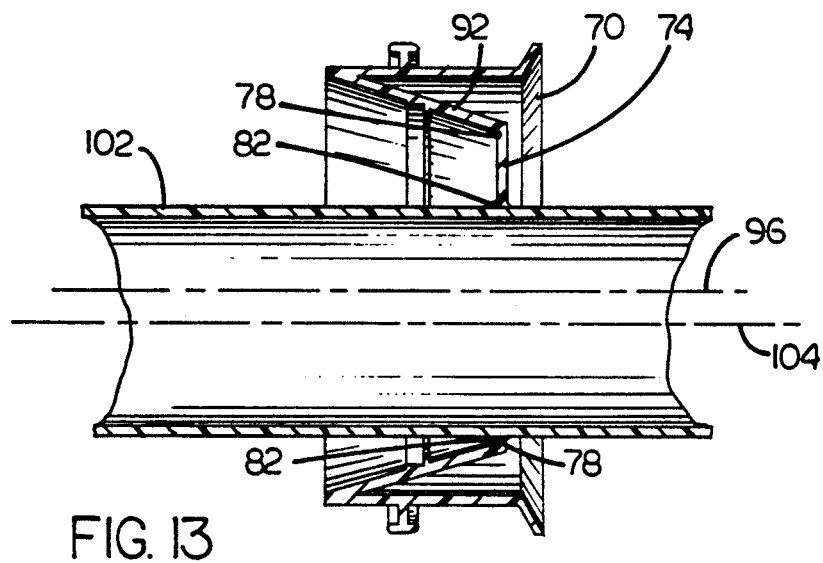
FIG. 13
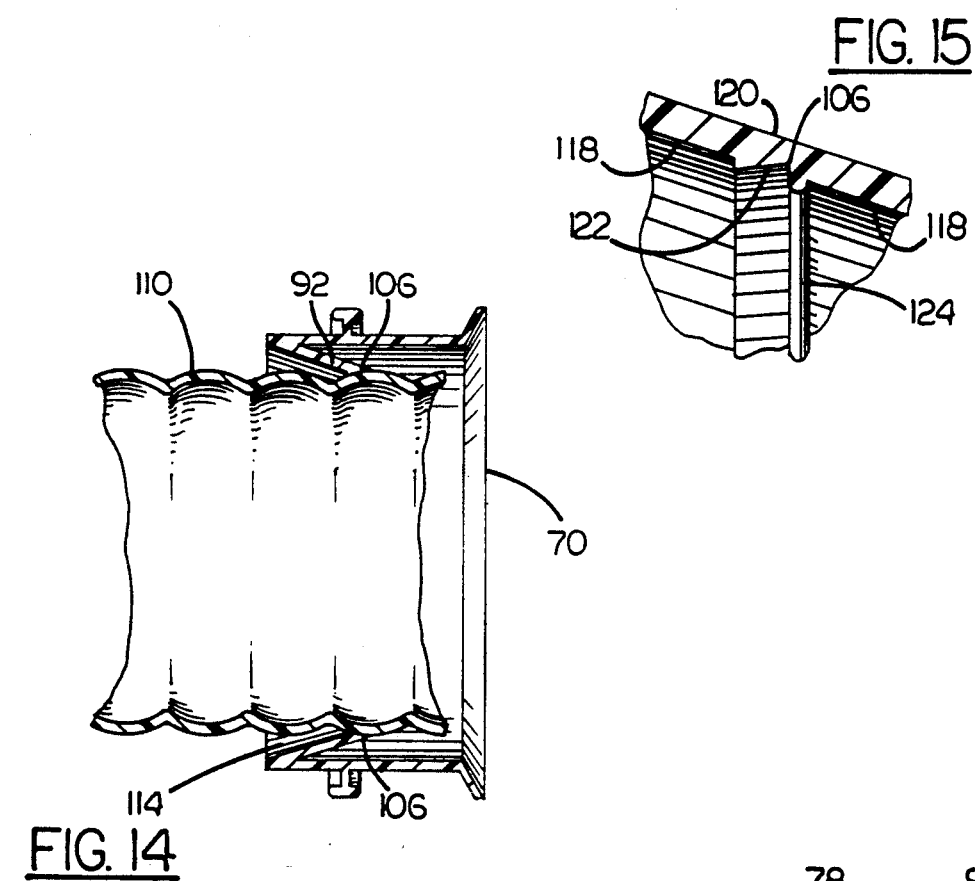
FIG. 15
FIG. 14
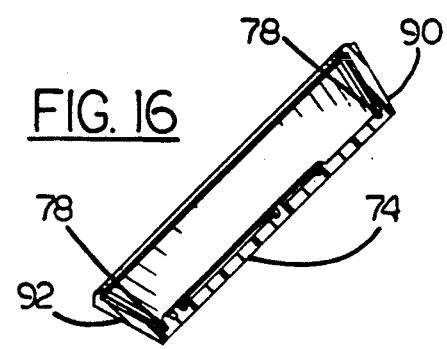
FIG. 16

ASYMMETRICAL PIPE SEAL AND CLOSURE MEMBER

This application is a continuation of application Ser. No. 07/810,604, filed Dec. 19, 1991, now abandoned.

BACKGROUND OF THE INVENTION

The present invention relates to a dual purpose pipe seal and closure member for use in low pressure installations as for example septic field distribution boxes and septic tanks. A relatively slow and tedious grouting procedure is commonly used in sealing pipes having end portions in communication with the interior of septic field distribution boxes and the like.

It is the general object of the present invention to provide a pipe seal and closure member which may be cast in situ and which may thereafter be readily employed either as a closure member or as a rapidly assembled and effective seal about an end portion of a pipe in communication with the interior of a distribution box or the like. More particularly, the seal is constructed to selectively accept and support in a position for good drainage, a plurality of different diameter pipes and to accurately and securely provide a quick permanent connection for a baffle arrangement adjacent the end of the pipe inside the distribution box. The present invention includes many of the features of U.S. Pat. Nos. 4,732,397 and 4,805,920 patented by Norman W. Gavin on Mar. 22, 1988 and Feb. 21, 1989 respectively. The present invention is an improvement on the invention claimed in U.S. Pat. No. 4,805,920.

SUMMARY OF THE INVENTION

In fulfillment of the foregoing objects a seal and closure member of an elastomeric material is provided which is adapted to be mounted in a cylindrical aperture and to receive an end portion of a pipe in a monolithically cast distribution box or the like of cementitious material.

The seal comprises an annular elastomeric body portion having generally cylindrical inner and outer surfaces with the former defining a central cylindrical pipe receiving opening which extends axially through the body portion and the latter engageable with the aperture wall. An integral annular flange on the body portion extends generally radially outward and is adapted to be embedded in the cast cementitious material about the aperture whereby to secure the seal in position in the aperture. A hollow generally frusto-conical sealing skirt is formed integrally at its larger diameter end portion with the body portion of the seal and projects inwardly at an angle between radial and axial planes. The skirt departs from the axial direction at an angle between 10 and 45 degrees and preferably at an angle in the neighborhood of 20 degrees. The smaller diameter end portion of the sealing skirt is slightly smaller in diameter than the pipe to be received thereby and is disposed radially inwardly from the inner cylindrical surface of the body portion of the seal. Thus, the said smaller end portion of the skirt is free for at least a nominal degree of expansion diametrically.

As will be apparent, with the seal mounted in an aperture in a distribution box or the like, the frusto-conical sealing skirt is adapted to receive and guide an end portion of a pipe which may be introduced at its larger diameter end portion and urged toward and axially through its said smaller and free end portion. This results in a slightly expansion diametrically of the free end portion of the skirt and in any event serves to establish firm frictional engagement and effective sealing between the skirt and the exterior peripheral surface of the pipe. Preferably during assembly, the pipe end portion is urged axially through the skirt a short distance and then retracted for good sealing engagement.

Axial misalignment between the pipe and seal is readily accommodated by the skirt with the pipe as much as 15 degrees out of axial alignment.

The frusto-conical sealing skirt includes a weakened narrow annular portion which is axially spaced from the smaller free end portion. The smaller diameter end of the skirt beyond the weakened narrow annular portion of the skirt may be knocked off by punching action on the weakened portion by a screw driver, whereby the seal is made to receive a pipe of a larger diameter than can be accommodated by the smaller free end portion of the skirt.

As mentioned, a dual purpose is envisioned for the seal and closure member and this is accomplished with the provision of a knock-out web which takes the form of a substantially circular disk and which extends radially across the smaller diameter or free end portion of the frusto-conical sealing skirt of the seal. The web is formed integrally with the skirt and is provided with a first weakened narrow annular portion adjacent the free end portion of the skirt whereby to facilitate web knock-out. That is, preferably, a narrow annular band of reduced thickness is provided at the junction between the knock-out web and the smaller diameter end portion of the skirt. As will be apparent, the seal can be cast in situ during precasting of a septic field distribution box or the like and each such seal may be provided with a knock-out web. Thereafter, with a number of apertures and corresponding seals in the distribution box, those apertures which are to be provided with pipes may be selected and the corresponding knock-out webs may be removed as by means of a punching action with a screw driver. The pipe end portions may then be engaged or assembled with the seals as described above and the remaining seal and closure members may be left in the aperture closing condition with the knock-out webs intact.

The knock-out web includes a second knock-out portion which has a further weakened narrow annular portion, inwardly of the weakened annular portion at the free end of the skirt. By this arrangement the user can selectively knock-out the entire web, or only a smaller portion of it, so that the seal may selectively accommodate different sized pipes through the web.

The center of the second weakened narrow annular portion is radially displaced from the center of the first weakened annular portion of the web, and a side of the second weakened narrow annular portion closely approaches tangency to the first weakened narrow annular portion in the general direction of the displacement. The seal is rotated for installation so that the tangency is at the lowest point. This provides improved drainage in that a pipe which is received through the web knock-out of the second weakened narrow annular portion, and supported by the web, because it is installed lower in the aperture of the box than if center of the second weakened narrow annular portion coincided with the center of the first weakened narrow annular portion. Another advantage is that there is better support provided for a pipe through the web which approaches tangency at its lowest point with the frusto-conical sealing skirt.

A manufacturer need only purchase and use a single seal even though a plurality of differently sized pipes may be connected to the distribution box. The seal will also accommodate straight walled and corrugated walled pipes.

An integral boss arrangement on the seal permits a deflection baffle to be mounted directly on the seal opposite the end of a pipe mounted in the seal. This arrangement eliminates any need for the manufacturer or assembler to drill into the concrete of the box for purposes of securing a baffle to the interior of the box.

The above and other objects, features and advantages of the present invention will be apparent from the following detailed description of an illustrative embodiment thereof which is to be read in connection with the accompanying drawing wherein:

BRIEF DESCRIPTION OF THE DRAWINGS

FIGS. 1-10 show prior art, and are identical with FIGS. 1-10 of U.S. Pat. No. 4,805,920.

FIG. 1 is a perspective view partially broken away for clarity of illustration, and showing somewhat schematically a septic field distribution box with three (3) end portions of pipes entered in apertures therein and in communication with the interior thereof.

FIG. 2 is an enlarged side view of a seal and closure member constructed in accordance with the present invention.

FIG. 3 is an enlarged end view of a seal and closure member taken generally as indicated at 3, 3 in FIG. 2.

FIG. 4 is a sectional view through the seal and closure member taken generally as indicated at 4, 4 in FIG. 3.

FIG. 5 is a fragmentary vertical section through a portion of a distribution box and shows a seal and closure member cast in situ with portions of associated forms.

FIG. 6 is a view similar to FIG. 5 but shows a portion of a form in a retracted position.

FIG. 7 is a horizontal sectional view taken along line 7,7 of FIG. 5.

FIG. 8 is a view similar to FIGS. 5 and 6 but with the forms omitted and with the knock-out web in a knock-out operation.

FIG. 9 is a view similar to FIG. 8 but with an end portion of a pipe entered into sealing engagement with the seal of the present invention.

FIG. 10 is a view similar to FIG. 8 but showing a portion of the distribution box, a pipe seal, and a severely misaligned end portion of a pipe.

FIG. 13 is a cross section side view of the seal and closure member shown in FIG. 11, receiving a smooth walled pipe in sealing engagement with with seal.

FIG. 14 is a cross section side view of the seal and closure member shown in FIG. 14, receiving a large, corrugated pipe in locked, sealing engagement with the seal.

FIG. 15 is a cross section view of a portion of the seal shown in FIG. 11 at AA.

FIG. 16 is a cross section view of a part of the seal knocked off to prepare the seal to receive the large pipe as shown in FIG. 14.

DESCRIPTION OF THE PREFERRED EMBODIMENTS

Figure 10:
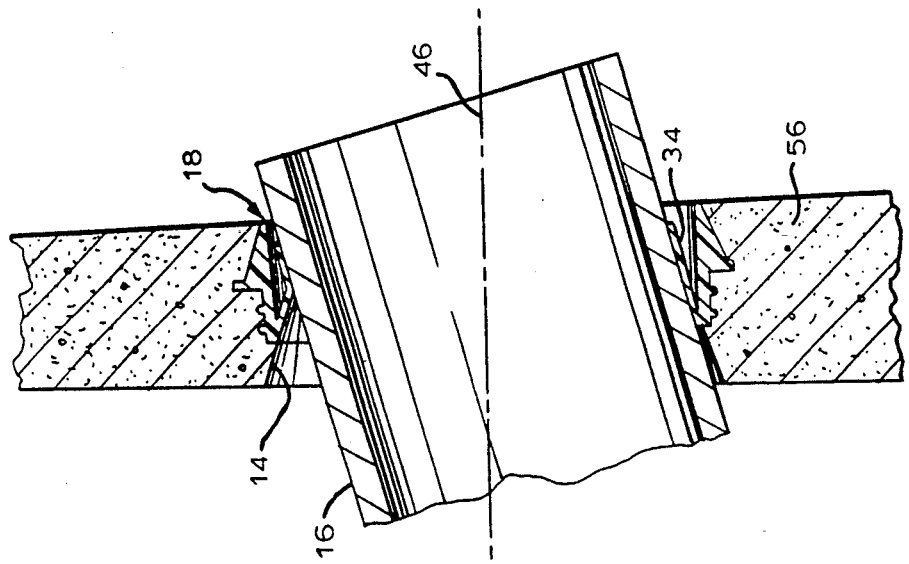

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figure 1:
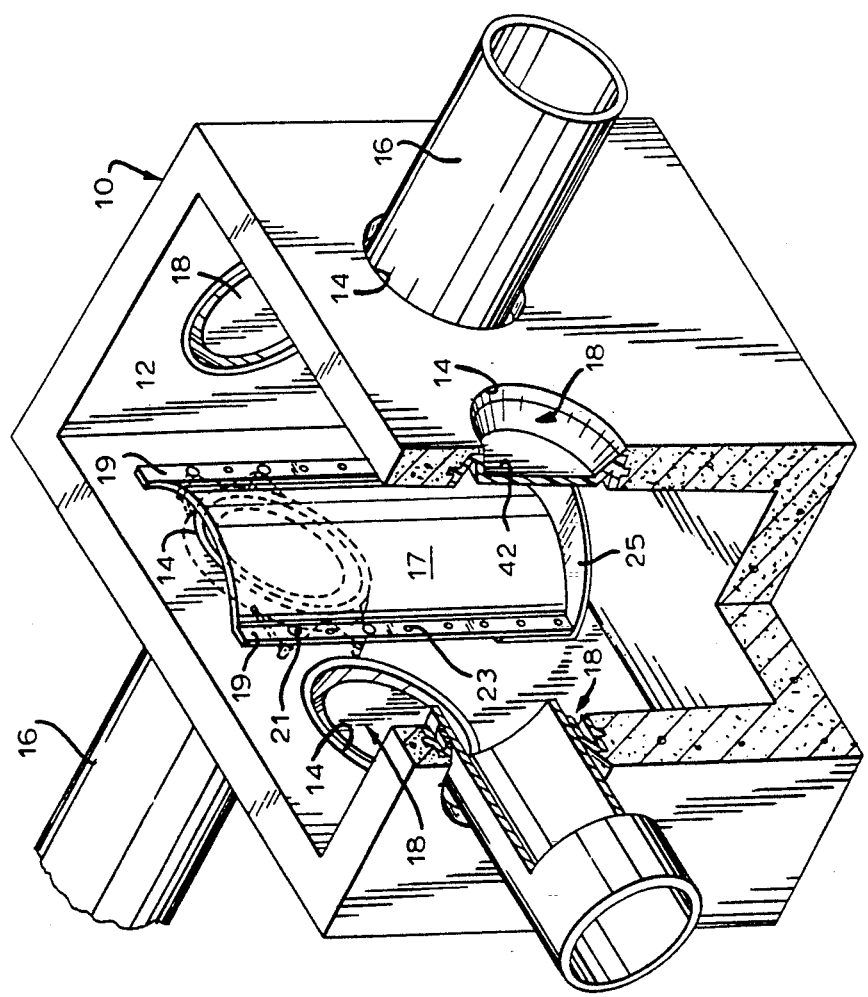

Referring now to the drawings in detail and in particular to FIG. 1, a septic field distribution box as indicated generally at 10 and is of a conventional monolithically cast construction and of a cementitious material, as shown, e.g. concrete. The box has an aperture 12 in each end wall and two (2) apertures in each of the front and back side walls of the box are similarly provided with a pipe 16. The remaining apertures are unused and are each provided with a seal and closure member 18 so as to prevent flow therethrough. Seal and closure members 18 associated with the pipes 16 shown have been converted to pipe seals by removal of their knock-out webs. A plastic baffle 17 having a generally semi-cylindrical shape, or the like, includes integral edge flanges 19 which are secured to the box 10 on the inner surface thereof opposite the end of the pipe 16 extending through the back wall of the box. The baffle is mounted on the adjacent seal and closure member 18 by screws 21 which extend through holes 23 formed in flanges 19 and into member 18. A deflector baffle 25 may be secured to the end of baffle 17 if desired.

Figure 4:
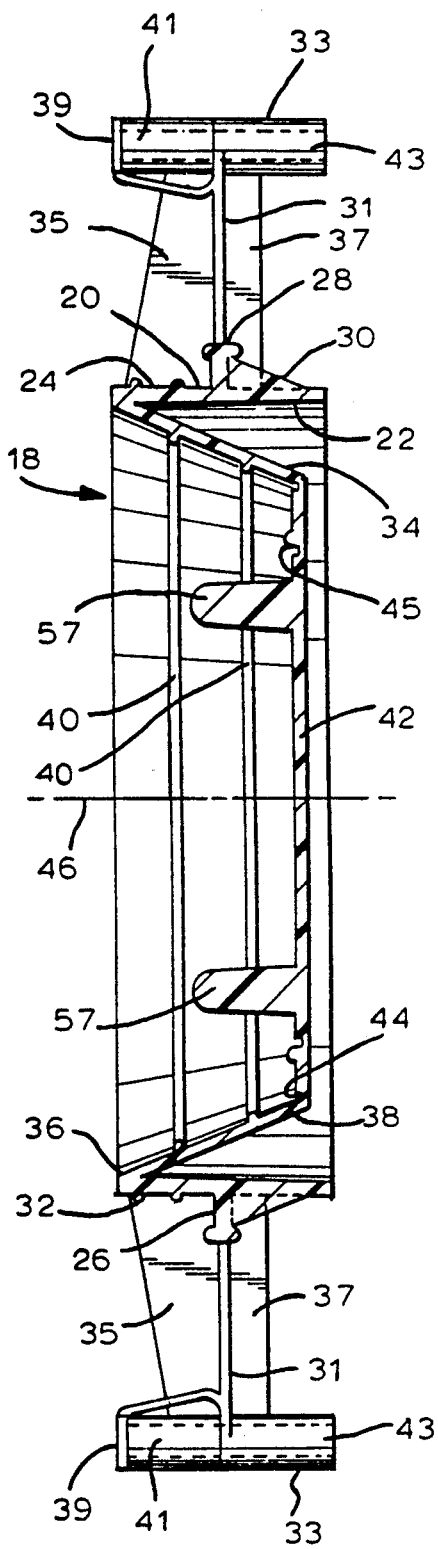

Referring to FIGS. 2 through 4, it will be observed that the seal end closure member 18 includes an annular body portion 20, FIG. 4, which has generally cylindrical inner and outer surfaces 22, 24. As shown in FIG. 4, there is a slight relative inclination of the surfaces 22, 24 from the right to left or front to rear with the body portion thus becoming somewhat thinner in progression toward the rear. Various other configurations fall within the scope of the invention. The inner cylindrical surface 22 defines a central cylindrical pipe receiving opening which extends axially through the body portion 20. The outer cylindrical surface 24 is engageable with the wall of an aperture in a distribution box such as the box 10 in a manner to be more fully described hereinbelow.

As best illustrated in FIG. 4, an integral annular flange 26 extends generally radially outwardly from the body portion 20. Flange 26 may optionally carry a rim 28 at an outer portion thereof and which extends generally axially therefrom. The flange 26 and rim 28 are adapted to be embedded in cast cementitious material about an aperture whereby to secure the seal and closure member in position in the aperture. Precasting of the seal and closure member in situ will be further described hereinbelow.

Preferably, a plurality of circumaxially spaced small integrally formed generally triangular gussets 30, 30 are provided and each such gusset extends in an axial plane between the flange 26 and the body portion 20. As shown in FIG. 3 eight (8) gussets 30, 30 are provided. Further, annular strengthening ribs may be provided in the body portion 20 as illustrated at 32, 32.

A hollow generally frusto-conical sealing skirt 34 is formed integrally at a larger diameter end portion 36 with the seal body portion 20 and projects inwardly at an angle between radial and axial planes as best illustrated in FIG. 4. The smaller diameter end portion 38 of the skirt 34 is slightly smaller in diameter than the external diameter of the pipe to be received therethrough and is disposed radially inwardly from the inner cylindrical body surface 22 and is thus free to expand diametrically. Annular strengthening ribs may also be provided as at 40, 40 in the body of the skirt 34.

As illustrated in FIG. 4, the skirt 34 is provided at its free end portion 38 with a knock-out web 42 which takes the form of a substantially circular disk and which extends radially across the said free end portion of the skirt. The knock-out web 42 is formed integrally with the skirt 34 and has a weakened narrow annular portion 44 adjacent the skirt free end portion to facilitate web knock-out. Preferably and as illustrated, the weakened annular portion of the web 42 takes the form of a narrow band 44 of reduced thickness but imperforate elastomeric material which interconnects the skirt end portion 38 and the web 42.

Web 42 is also provided with an inner annular narrow band 45 of reduced thickness, inwardly of an annular rib 47. In one embodiment the band 45 is located one-half an inch radially inwardly of band 44 so that the user can selectively knock out the inner disk defined by band 45 or the larger disk defined by band 44 so that the seal can selectively receive differently sized pipes, e.g. a 4 inch pipe or a three-inch diameter pipe.

The skirt 34 preferably resides at an angle between 10 degrees and 45 degrees with the axis of the aperture and seal as indicated at 46 and, more particularly, it is presently believed that an angle in the neighborhood of 20 degrees will provide optimum results. The material of the seal and closure member may vary widely within the scope of the invention and, for example, may comprise any of a number of known thermoplastic materials.

Figure 9:
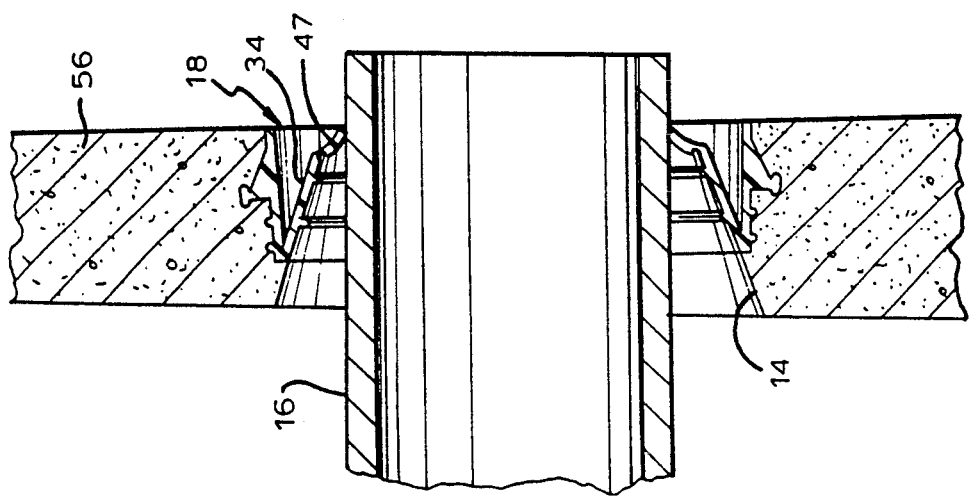
Figure 8:
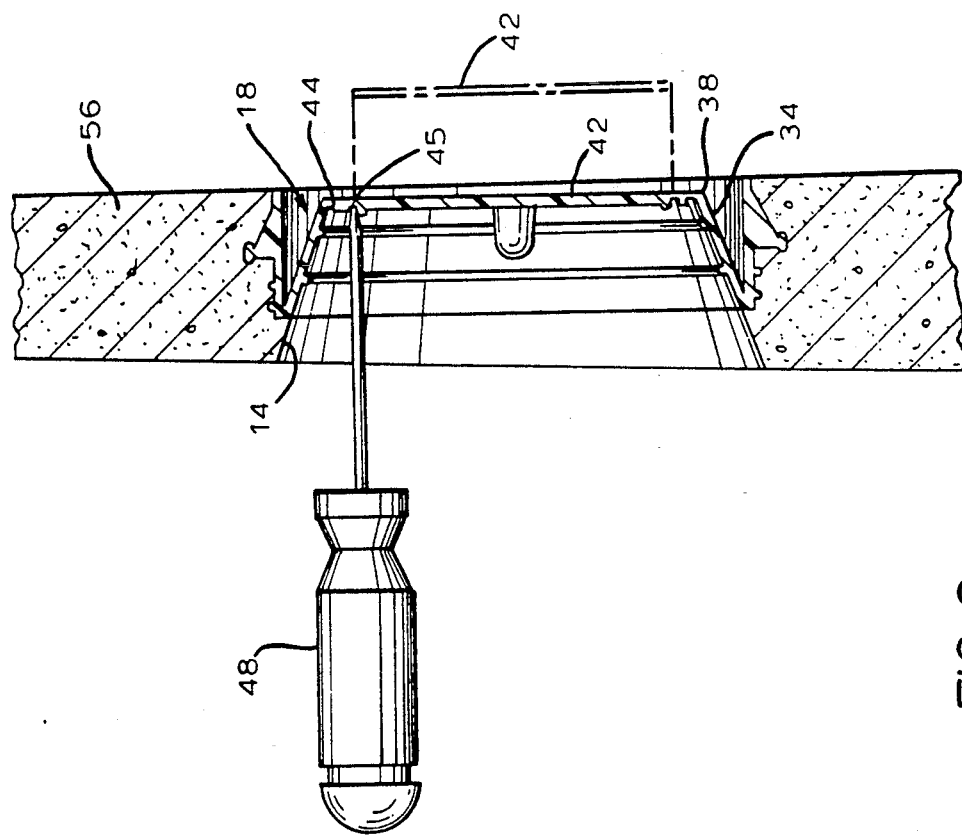

FIGS. 8 and 9, the manner in which a seal 18 cooperates with a pipe 16 in assembly is illustrated. As shown therein the smaller inner disk of the knock-out web 42 is removed by means of a punching operation with a screw driver 48, at band 45.

With the pipe 16 moved axially rightwardly in FIG. 9, it will be apparent that its end portion may be introduced to the sealing skirt 34 and urged toward and axially through its free or smaller diameter end portion. Preferably, the pipe is moved rightwardly from the position shown in FIG. 9 through a distance of a few inches and than retracted to the position shown in order to establish firm frictional engagement and effective sealing between the exterior peripheral surface of the pipe and the and the skirt 34. In this case the rib 47 aids in forming a seal on the pipe and the narrow band 44 permits the annular portion of disk 42 between bands 44 and 45 to bend outwardly around the pipe.

In FIG. 10, a pipe 16 is illustrated in a condition of severe axial misalignment as compared with the substantially precise axial alignment of the pipe 16 in FIG. 8. That is the pipe in FIG. 10 is perhaps as much as 15 degrees in axial misalignment with an axis 46 of seal 18. Nevertheless, as shown, the skirt 34 is capable of accommodating such misalignment of the pipe and the skirt remains in firm engagement and in good sealing contact with the exterior surface of the pipe.

Figure 12:
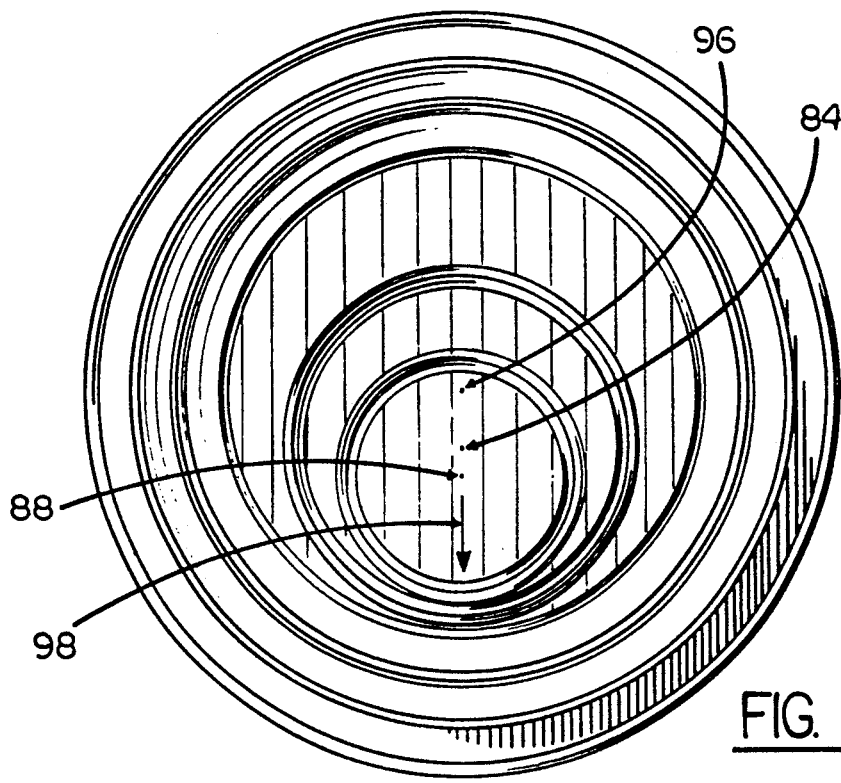
FIG. 12 is a top view of the seal and closure member shown in FIG. 11.
Figure 11:
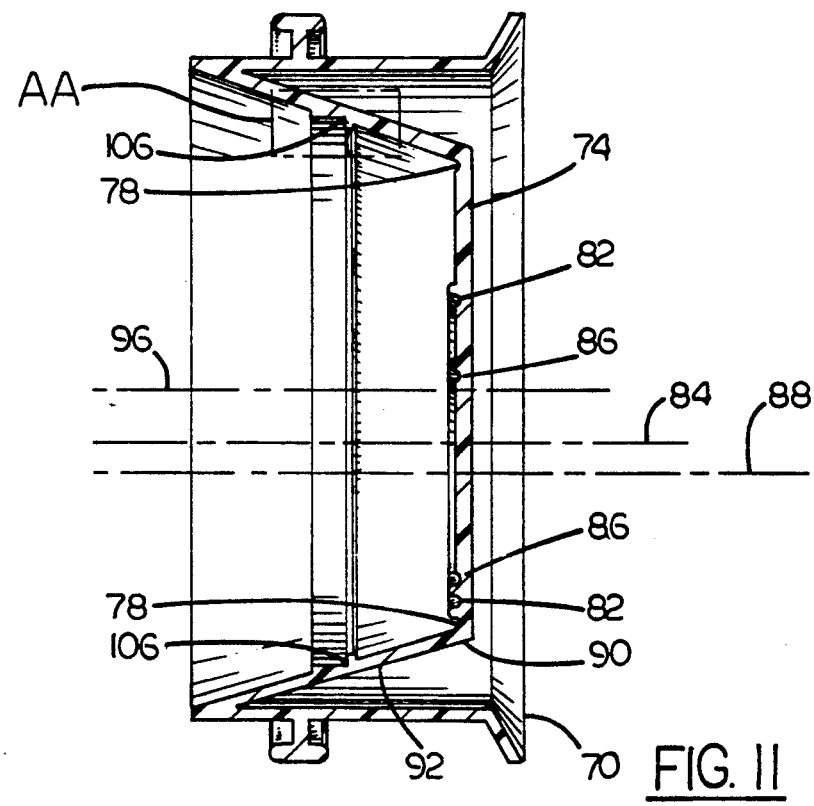
FIG. 11 is a cross section side view of another seal and closure member constructed in accordance with the present invention.

Referring to FIGS. 11 and 12, web 74 of pipe seal 70 includes weakened narrow completely round, of uniform radius from axis 96, annular portion 78 adjacent to the free end portion 90 of frusto-conical sealing sealing skirt 92.

Although portion 78 is shown by way of example to be concentric with free end portion 90, it is within the contemplation of the invention that only the lower part of portion 78 be adjacent to the skirt and that the axis of portion 78 would not be in common with axis 96 of free end portion 90.

Weakened narrow completely round, of uniform radius from axis 84, annular portion 82 of the web is smaller than portion 78. The axis 84 of portion 82 is radially displaced downward from the axis 96 of portion 78, wherein portion 82 approaches tangency to but does not coincide with portion 78 in the general direction of the displacement. That direction is represented by arrow 98 in FIG. 12.

In like manner, weakened narrow completely round, of uniform radius from axis 88, annular portion 86 is smaller than portion 82, with portion 86 approaching tangency to but not coinciding with portion 82 in the general direction of the displacement. The axis 88 of portion 86 is radially displaced downward from the axis 84 of portion 82.

Weakened narrow annular portion 106 of frusto-conical sealing skirt 92, axially spaced from web 74 or free end portion 90, provides for receiving larger pipe.

FIG. 13 shows straight walled pipe 102 received through a knocked out portion of skirt 92 bounded by portion 82. Support for the pipe is improved by the location of the pipe being closer to the wall of skirt 92. Drainage through the pipe is improved by the pipe being lower in the seal than if the central axis 104 of the pipe would be in common with the center 96 of the seal. The completely round, of constant radius, annular seal provides full circumferential sealing contact around the pipe with the pipe's outer surface.

FIG. 14 shows large diameter pipe 110, such as corrugated-SCH 40 pipe, received through seal 70. The angle of the skirt wall at the knock-out bounded by weakened narrow annular portion 106 of frusto-conical sealing skirt 92, reduces force needed to insert the pipe through opening 114 of the seal, and resists accidental withdraw of the pipe while it flexes slightly to form a liquid tight seal.

FIG. 15 shows a skirt wall configuration about weakened narrow annular portion 106 as in AA of FIG. 11, in greater detail. Inner wall surface 118 is generally parallel to outer wall surface 120. Surface 122 is of constant diameter for gripping and sealing against a pipe such as pipe 110 over a wider band of contact. Ridge 124 adds stiffness and falls away when a screw driver is inserted in weaker portion 106 in order to remove the smaller diameter end of skirt 92 to provide an opening for pipe 110.

FIG. 16 shows the part of seal 70 that was knocked off at portion 106 in FIG. 15.

Referring to FIGS. 2-4, seal and closure member 18 has integrally formed arms 31 extending in opposed generally radially extending pairs. The arms 31 are generally triangularly shaped and have hollow cylindrical bosses 33 formed at the ends thereof. These bosses extend generally parallel to the axis 46 of the seal. The arms 31 are reinforced by opposed, perpendicularly extending buttress wall 35, 37. The arms and bosses may be included on any seal construction of the invention, such as on pipe seal 70.

In the molding process, in order for the bosses to be formed with hollow cylindrical cores their ends must be open to permit removal of the mold elements. Accordingly, removable plugs 39 are provided on the inner ends 41 of bosses 33 to permit the user to close those ends before the seals are mounted in the distribution box forms, as described hereinafter, to prevent concrete from entering the hollow cores of these bosses. The opposite ends 43 of bosses 33 are arranged to align with the inner surface of the distribution box when formed to permit the baffle to be mounted thereon by the screws 21 which are threaded into the cores of bosses 33.

Figure 5:
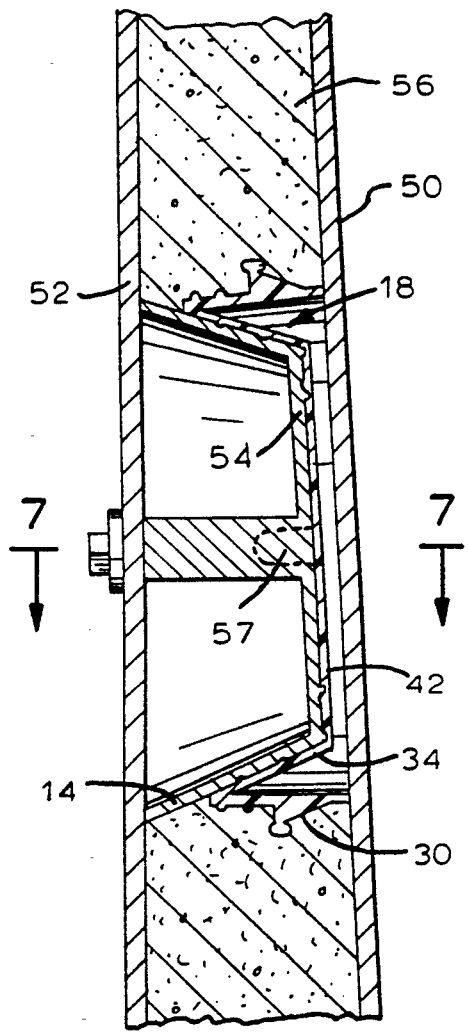
Figure 6:
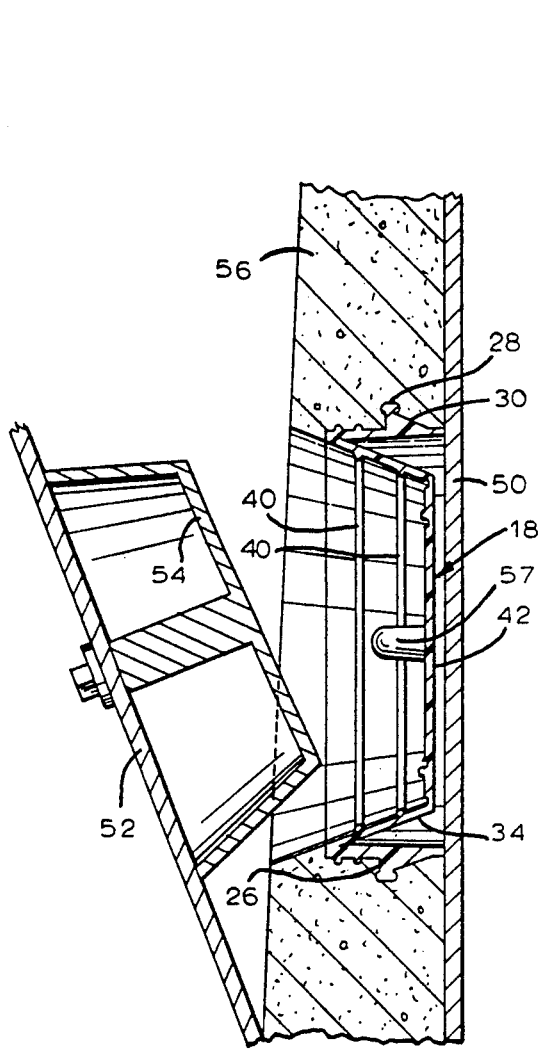
Figure 7:
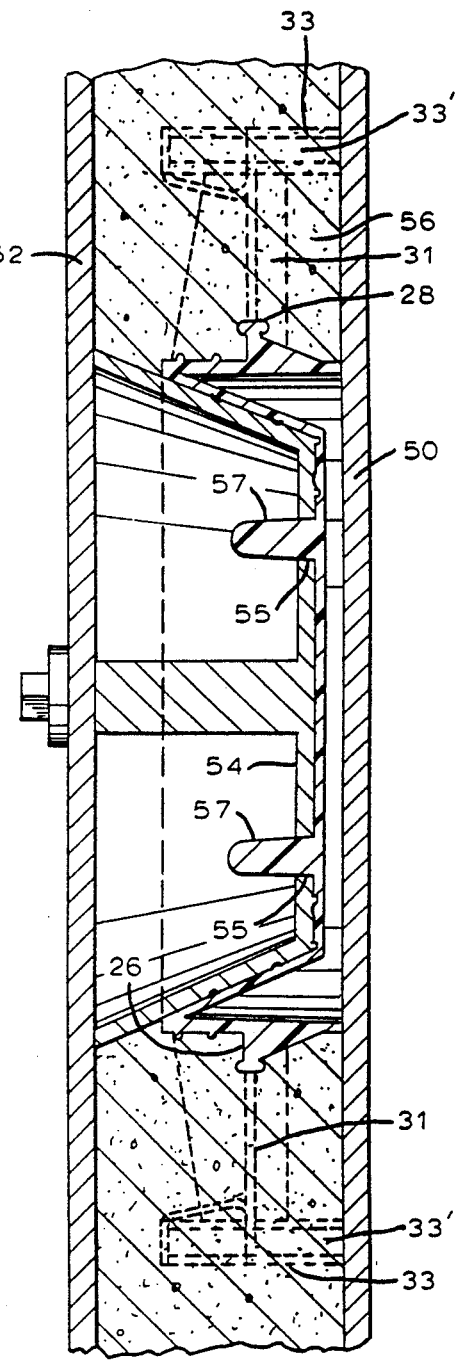

Referring now to FIGS. 5-7, the manner in which the seal may be cast in situ is illustrated. A portion of a foam core is shown at 50 with a portion of a foam jacket illustrated at 52. The jacket 52 is adapted for movement relative to the core and may be swung from the FIG. 5 position to the FIG. 6 position as illustrated. With the core 50 and jacket 52 in the relative positions of FIG. 5, a plug 54 carried by the jacket 52 may be employed to mount a seal and closure member 18 as illustrated. That is, the seal and closure member may be fitted on and about the plug internally of the core and jacket. Preferably the core 54 has a pair of apertures 55 formed therein adapted to receive pins 57 integrally formed on the disk 42 of the seal. The apertures 55 and pins 57 are arranged so that when engaged, the arms 31 are located in the mold so that the bosses 33 on opposite sides of the seal are vertically aligned, as shown in dotted lines in FIG. 1, to align with the holes 23 in the flanges 19 of baffles 17. In addition, by this construction, the front faces 33' of the bosses are flush with core 50 and, thus, exposed at the inner face of the concrete when the form or mold is stripped.

Subsequently, and during casting of the concrete 56 forming a portion of the distribution box or other precast structure, the seal and closure member serves as an integral part of the form together with the core 50, the jacket 52, and the plug 54. That is, the concrete 56 is cast about the seal and the seal serves to partially define an aperture 14 in the cast structure. The remaining portion of the aperture 14 is defined by the plug 54, and when the jacket 52 and the plug 54 are swung in a counter-clockwise direction as illustrated in FIG. 6, the cast structure may be removed from the core 50 to provide a seal and closure member containing aperture 14, as best illustrated in FIG. 8. Thereafter, the seal and closure member 18 may be employed selectively to close the aperture 14 or to seal a pipe therein respectively by retention or removal of the knock-out web 42. In addition, baffle 17 can be secured to the distribution box adjacent the end of a pipe therein by simply inserting screws through the flanges 19 into the hollow bosses 33. This eliminates any need for drilling the concrete to mount a baffle thereon and permits rapid and accurate mounting of the baffle to the box opposite the pipe end.

From the foregoing, it will be apparent that a highly effective dual purpose seal and closure member has been provided. Apertures in distribution boxes and the like may be selectively closed or provided with pipes of different diameters in communication with the interior of the box merely through the selective removal of appropriate knock-out webs. A quickly assembled and efficient sealing and draining operation of a desired number of well supported pipes is provided for in the distribution boxes and the like and the seal and closure members can be provided at substantial economic advantage as a result of the casting of the same in place during casting of the boxes or the like.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A combination aperture closure and low pressure seal for an exterior surface of a pipe adapted to be mounted in a cylindrical aperture and to receive an end portion of a pipe in a monolithically cast fluid distribution box or the like of cementitious material; said seal being composed of molded elastomeric material and comprising an annular body portion having generally cylindrical inner and outer surfaces, the former defining a central cylindrical pipe receiving opening which extends axially through the body portion and the latter engageable with a wall of the aperture, an integral annular flange on said body portion extending generally radially outwardly and adapted to be embedded in the case cementitious material about the aperture during casting of said box whereby to secure the seal in position in the aperture, and a hollow generally frusto-conical sealing skirt having a larger diameter end portion and a smaller diameter end portion with the seal body portion and projecting inwardly at an angle between radial and axial planes, the smaller diameter than the pipe to be received and being disposed radially inwardly from said inner cylindrical body surface and free to expand diametrically, said frusto-conical sealing skirt being adapted to receive and guide an end portion of a pipe introduced at its said larger diameter end portion and urged toward and axially through its said free smaller diameter end portion whereby to slightly diametrically expand said free end potion and thus to establish firm frictional engagement and effective sealing thereof with the exterior peripheral surface of the pipe, said seal further incurring a knock-out web which takes a substantially circular disk configuration and which extends radially across the smaller diameter free end portion of the frusto-conical sealing skirt, said web being molded integrally with the skirt and having an integrally molded first weakener narrow, completely round, of uniform radius, annular portion adjacent the skirt free end portion to facilitate web knock-out and a second weakened narrow, completely round, of uniform radius annular portion radially inwardly of said first weakened annular portion so that said web can be knocked out at either said first or said second weakened narrow annular portions whereby said seal can serve a dual purpose selectively as a closure for an associated aperture and a seal in full circumferential contact around a pipe for pipes of one of two different diameters entered in the aperture, a first axis, the radius of said first weakened narrow annular portion having said first axis, a second axis, the radius of said second weakened narrow annular portion having said second axis, said second axis being radially displaced from the first axis, and said second weakened narrows annular portion approaching tangency to but not coinciding with said first weakened annular portion in the general direction of said displacement of said second axis from said first axis.

2. A seal as set forth in claim 1 including a third weakened narrow annular portion formed in the web, a side of said third weakened annular portion approaching tangency to said second weakened narrow annular portion in the general direction of said displacement.

3. A combination aperture closure and low pressure seal for an exterior surface of a pipe adapted to be mounted in a cylindrical aperture and to receive an end portion of a pipe in a monolithically cast fluid distribution box or the like of cementitious material; said seal being composed of molded elastomeric material and comprising an annular body portion having generally cylindrical inner and outer surfaces, the former defining a central cylindrical pipe receiving opening which extends axially through the body portion and the latter engageable with a wall of the aperture, an integral annular flange on said body portion extending generally radially outwardly and adapted to be embedded in the case cementitious material about the aperture during casting of said box whereby to secure the seal in position in the aperture, and a hollow generally frusto-conical sealing skirt having a larger diameter end portion and a smaller diameter end portion, formed integrally at its larger diameter end portion with the seal body portion and projecting inwardly at an angle between radial and axial planes, the smaller diameter end portion of said sealing skirt being slightly smaller in diameter than the pipe to be received and being disposed radially inwardly from said inner cylindrical body surface and free to expand diametrically, said frusto-conical sealing skirt being adapted to receive and guide an end portion of a pipe introduced at its said larger diameter end portion and urged toward and axially through its said free smaller diameter end portion whereby to slightly diametrically expand said free end portion and thus to establish firm frictional engagement and effective sealing thereof with the exterior peripheral surface of the pipe, said seal further including a knock-out web which takes a substantially circular disk configuration and which extends radially across the smaller diameter free end portion of the frusto-conical sealing skirt, said web being molded integrally with the skirt and having an integrally molded first weakened narrow, completely round, of uniform radius, annular portion adjacent the skirt free end portion to facilitate web knock-out and said frusto-conical sealing skirt comprising a weakened narrow annular portion axially spaced from said first weakened first annular portion so that said web can be knocked out at either said first weakened narrow annular portion of said weakened narrow annular portion of said sealing skirt whereby said seal can serve a dual purpose selectively as a closure for an associated aperture and a circumferential seal about a pipe for pipes of one of two different diameters entered in the aperture, a second weakened narrow, completely round, of uniform radius, annular portion of said web radially inwardly of said first weakened annular portion, a first axis, the radius of said first weakened narrow annular portion having said first axis, a second axis, the radius of said second weakened narrow annular portion having said second axis, said second axis being radially displaced from the first axis, and said second, weakened narrow annular portion approaching tangency to but not coinciding with said first weakened narrow annular portion in the general direction of said displacement of said second axis from said first axis.

4. A seal as set forth in claim 3 including a third weakened annular portion formed in the web, one side of said third weakened annular portion approaching tangency to said second weakened narrow annular portion in the general direction of said displacement.

5. A seal for an exterior surface of a pipe adapted to be mounted in a cylindrical aperture and to receive an end portion of a pipe in a monolithically cast fluid distribution box or the like of cementitious material; said seal being composed of molded elastomeric material and comprising an annular elastomeric body portion having generally cylindrical inner and outer surfaces, the former defining a central cylindrical pipe receiving opening which extends axially through the body portion and the latter engageable with a wall of the aperture, an integral annular flange on said body portion extending generally radially outwardly and adapted to be embedded in the case cementitious material about the aperture whereby to secure the seal in position in the aperture, and a hollow generally frusto-conical sealing skirt having a larger diameter end portion and a smaller diameter end portion, formed integrally at its larger diameter end portion with the seal body portion and projecting inwardly at an angle between radial and axial planes, the smaller diameter end portion of said sealing skirt being slightly smaller in diameter than the pipe to be received and being disposed radially inwardly from said inner cylindrical body surface and free to expand diametrically, and said frusto-conical sealing skirt being adapted to receive and guide an end portion of a pipe introduced at its said larger diameter end portion and urged toward and axially through its said free smaller diameter end portion whereby to slightly diametrically expand said free end portion and thus to establish firm frictional engagement and effective sealing thereof with the exterior peripheral surface of the pipe; said seal having a plurality of integrally formed generally radially extending arms including mounting bosses formed thereon and extending generally perpendicularly to said arms and generally parallel to the axis of a pipe inserted in the seal, whereby a baffle may be secured opposite the end of a pipe inserted in the seal by securing the baffle to said bosses, said frusto-conical sealing skirt further comprising a weakened narrow annular portion axially spaced from said free end portion, said seal being adapted to serve a dual purpose selectively as a closure for an associated aperture and a seal for a pipe entered in the aperture, and wherein said seal includes a knock-out web which takes a substantially circular disk configuration and which extends radially across the smaller diameter free end portion of the frusto-conical sealing skirt, said web being formed integrally with the skirt and having a first weakened narrow, completely round, of uniform radius, annular portion adjacent the skirt free end portion to facilitate web knock-out, and said seal further including a second weakened, completely round, of uniform radius, annular portion formed in the web radially inwardly of said first portion whereby said seal may selectively receive one of two different diameter pipes, and be in full circumferential contact around said pipe, a first axis, the radius of said first weakened narrow annular portion having said first axis, a second axis, the radius of said second weakened narrow annular portion having said second axis that is radially displaced from the first axis, and said second, weakened narrow annular portion approaching tangency to but not coinciding with said first weakened narrow annular portion in the general direction of said displacement of said second axis from said first axis.

6. A seal as set forth in claim 5 including a third weakened annular portion formed in the web, one side of said third weakened annular portion approaching tangency to said second weakened narrow annular portion in the general direction of said displacement.

* * * * *

UNITED STATES PATENT AND TRADEMARK OFFICE
CERTIFICATE OF CORRECTION

PATENT NO. : 5,286,040
DATED : Feb. 15, 1994
INVENTOR(S) : Norman W. Gavin

It is certified that error appears in the above-identified patent and that said Letters Patent is hereby corrected as shown below:

<u>Claim 1, column 8 of the patent:</u>

Line 25, change "case" to --cast--.

Line 29, after "a smaller diameter end portion", insert --,formed integrally at its larger diameter end portion--.

Line 32, after "planes, the smaller diameter", insert --end portion of said sealing skirt being slightly smaller in diameter--.

Line 40, change "potion" to --portion--.

Line 43, change "incurring" to --including--.

Line 48, change "weakener" to --weakened--.

Line 66, change "narrows" to --narrow--.

<u>Claim 3, column 9 of the patent:</u>

Line 21, change "case" to --cast--.

UNITED STATES PATENT AND TRADEMARK OFFICE
CERTIFICATE OF CORRECTION

PATENT NO. : 5,286,040
DATED : Feb. 15, 1994
INVENTOR(S) : Norman W. Gavin

It is certified that error appears in the above-indentified patent and that said Letters Patent is hereby corrected as shown below:

Claim 5, column 10 of the patent:
Line 21, change "case" to --cast--.

Signed and Sealed this

Twenty-first Day of June, 1994

Attest:

BRUCE LEHMAN

Attesting Officer    Commissioner of Patents and Trademarks